(12) United States Patent
Albo et al.

(10) Patent No.: US 8,151,475 B2
(45) Date of Patent: Apr. 10, 2012

(54) NORTH FINDING DEVICE, SYSTEM AND METHOD

(75) Inventors: Mordechay Albo, Doar Na Heffer (IL); Boris Bronshteyn, Netanya (IL)

(73) Assignee: Azimuth Technologies Ltd., Ra'anana (IL)

( * ) Notice: Subject to any disclaimer, the term of this patent is extended or adjusted under 35 U.S.C. 154(b) by 356 days.

(21) Appl. No.: 12/588,630

(22) Filed: Oct. 22, 2009

(65) Prior Publication Data

US 2010/0251557 A1 Oct. 7, 2010

(30) Foreign Application Priority Data

Apr. 7, 2009 (IL) .......................................... 198109

(51) Int. Cl.
*G01C 19/00* (2006.01)
(52) U.S. Cl. .......................................... 33/318; 33/324
(58) Field of Classification Search ............. 33/318–324
See application file for complete search history.

(56) References Cited

U.S. PATENT DOCUMENTS

| | | | |
|---|---|---|---|
| 2,820,303 A * | 1/1958 | Dudenhausen ............. | 33/317 R |
| 3,579,847 A | 5/1971 | Winter et al. | |
| 3,596,359 A | 8/1971 | Fukano | |
| 3,698,823 A | 10/1972 | Reynolds et al. | |
| 3,706,970 A | 12/1972 | O'Keefe | |
| 3,748,912 A | 7/1973 | Hildebrand | |
| 3,762,062 A | 10/1973 | Johnston | |
| 3,806,913 A | 4/1974 | Kerhoas et al. | |
| 3,827,157 A | 8/1974 | Owens | |
| 3,830,447 A | 8/1974 | Phillips | |
| 3,863,357 A | 2/1975 | Knapp et al. | |
| 3,890,718 A | 6/1975 | Gregerson et al. | |
| 3,894,341 A | 7/1975 | Kapeller | |
| 3,911,591 A | 10/1975 | Dohogne et al. | |
| 3,936,948 A | 2/1976 | Maselli | |
| 3,938,256 A | 2/1976 | Crocker, Jr. | |
| 3,979,090 A | 9/1976 | Brickner et al. | |
| 3,998,409 A | 12/1976 | Pistiner | |
| 4,087,919 A | 5/1978 | Huvers | |
| 4,109,391 A | 8/1978 | Wing | |
| 4,123,849 A | 11/1978 | Maughmer | |
| 4,166,406 A | 9/1979 | Maughmer | |

(Continued)

FOREIGN PATENT DOCUMENTS

DE 1 905 882 10/1970
EP 2239540 A1 * 10/2010

OTHER PUBLICATIONS

Anthony Lawrence: Modern Inertial Technology Navigation, Guidance, and Control; Second Edition, 1998.

(Continued)

*Primary Examiner* — Yaritza Guadalupe-McCall
(74) *Attorney, Agent, or Firm* — Foley Hoag LLP (57) ABSTRACT

A device includes: a gyroscope adapted to be mounted to a goniometer, wherein a sensitivity axis of the gyroscope is substantially perpendicular to a rotation axis of the goniometer, wherein the goniometer is adapted to provide at least a first goniometer azimuth reading (A1) at a first azimuthal direction and a second goniometer azimuth reading (A2) at a second azimuthal direction, wherein the gyroscope is adapted to provide at least a first gyroscope angular rate reading ($\omega$1) at the first azimuthal direction and a second gyroscope angular rate reading ($\omega$2) at the second azimuthal direction, wherein the device enables measurement of a tilt angle.

25 Claims, 5 Drawing Sheets

Static Conditions,
x- and y-gyos in the horizontal plane

U.S. PATENT DOCUMENTS

| Patent Number | | Date | Inventor(s) |
|---|---|---|---|
| 4,180,916 | A | 1/1980 | Brook |
| 4,185,394 | A | 1/1980 | Younkin |
| 4,214,482 | A | 7/1980 | Bouchard |
| 4,240,302 | A | 12/1980 | Karnick |
| 4,302,885 | A | 12/1981 | Levine et al. |
| 4,383,452 | A | 5/1983 | Imbeninato et al. |
| 4,443,952 | A | 4/1984 | Schulien et al. |
| 4,603,483 | A | 8/1986 | Wing |
| 4,669,323 | A | 6/1987 | Hojo et al. |
| 4,693,114 | A | 9/1987 | DeCarlo et al. |
| 4,800,501 | A | 1/1989 | Kinsky |
| 4,882,845 | A | 11/1989 | Boyer |
| 4,945,647 | A | 8/1990 | Beneventano et al. |
| 5,021,652 | A | 6/1991 | Arnold |
| 5,060,392 | A * | 10/1991 | Grasso ............... 33/324 |
| 5,117,559 | A | 6/1992 | Sindlinger et al. |
| 5,134,394 | A | 7/1992 | Beadle |
| 5,272,922 | A | 12/1993 | Watson |
| 5,369,889 | A * | 12/1994 | Callaghan et al. ............. 33/321 |
| 5,469,256 | A | 11/1995 | Hall et al. |
| 5,566,461 | A | 10/1996 | Wick et al. |
| 6,003,599 | A | 12/1999 | Huber et al. |
| 6,347,282 | B2 | 2/2002 | Estes et al. |
| 6,836,334 | B2 | 12/2004 | Bennett |
| 7,412,775 | B1 | 8/2008 | Karnick et al. |
| 7,451,059 | B2 * | 11/2008 | Malchi et al. ............... 702/151 |
| 2002/0041963 | A1 | 4/2002 | Konya et al. |
| 2002/0116130 | A1 | 8/2002 | Estes et al. |
| 2003/0236627 | A1 | 12/2003 | Estes |
| 2005/0189467 | A1 | 9/2005 | Harrison |
| 2007/0010965 | A1 * | 1/2007 | Malchi et al. ............... 702/151 |
| 2007/0095124 | A1 | 5/2007 | Naroditsky |
| 2009/0089001 | A1 * | 4/2009 | Lin ............... 702/92 |
| 2010/0088063 | A1 * | 4/2010 | Laughlin ............ 702/151 |
| 2010/0251557 | A1 * | 10/2010 | Albo et al. ............ 33/318 |
| 2010/0286950 | A1 * | 11/2010 | Heijkants et al. ............ 702/151 |

OTHER PUBLICATIONS

US 6,151,553, 11/2000, Estes et al. (withdrawn)

\* cited by examiner

Static Conditions,
x- and y-gyos in the horizontal plane

Battlefield Scenario

NORTH FINDING DEVICE, SYSTEM AND METHOD

PRIOR APPLICATION DATA

This application claims benefit and priority from Israeli Patent Application Number 198,109, titled "North Finding Device, System and Method", filed in the Israeli Patent Office on Apr. 7, 2009.

FIELD

Some embodiments relate to north-finding (or north-seeking) devices, systems and methods, which may be implemented with gyroscopes or gyrocompasses, such as, for example, fiber optic gyroscopes (FOG) or micro electromechanical system (MEMS) gyroscopes.

BACKGROUND

Many ground-based navigation applications require directional knowledge. Examples of such applications include aiming/targeting techniques (e.g., for mortar/artillery), navigation of autonomous ground vehicles, and surveying techniques. An important piece of information for use in ground-based navigation is knowledge of one's direction relative to the desired path of travel along the surface of the earth.

Conventional techniques for obtaining directional knowledge include using magnetic compasses, the Global Positioning System (GPS), gyroscopes, and radio signals. These techniques all present certain disadvantages. Magnetic compasses require local calibrations to obtain even marginal accuracy. The GPS requires supporting electronics and cannot be used underground. The GPS also requires the user to be moving, or the big antenna separation is needed for achieving accuracy. Also it is susceptible to local area jamming. Conventional gyroscopes are typically too large and expensive given accuracy needs.

SUMMARY

This summary section is intended to provide an overview of some embodiments, and should not be construed as limiting to any features described in this summary section.

Some embodiments provide techniques for north finding.

In some embodiments, a north finding device may comprise: a gyroscope adapted to be mounted to a goniometer such that the sensitivity axis of the gyroscope is essentially perpendicular to a rotation axis of the goniometer, wherein the goniometer is adapted to be leveled and wherein the goniometer is further adapted to provide at least a first goniometer azimuth reading (A1) at a first azimuthal direction and a second goniometer azimuth reading (A2) at a second azimuthal direction; and the gyroscope is adapted to provide at least a first gyroscope angular rate reading ($\omega 1$) at the first azimuthal direction and a second gyroscope angular rate reading ($\omega 2$) at the second azimuthal direction.

In some embodiments, the goniometer may comprise a stationary part and a movable part, wherein the movable part is adapted to rotate along the rotation axis between at least the first azimuthal direction and the second azimuthal direction and wherein the first goniometer azimuth reading (A1) is the angle between the movable part and the stationary part at the first azimuthal direction and the second goniometer azimuth reading (A2) is the angle between the movable part and the stationary part at the second azimuthal direction. The movable part may be manually movable.

In some embodiments, the device may be further adapted to calculate azimuth, based at least on: the first goniometer azimuth reading (A1) at the first azimuthal direction, the first gyroscope angular rate reading ($\omega 1$) at the first azimuthal direction; and the second goniometer azimuth reading (A2) at the second azimuthal direction and the second gyroscope angular rate reading ($\omega 2$) at the second azimuthal direction.

In some embodiments, the device may be functionally associated with a computer adapted to calculate azimuth, based at least on: the first goniometer azimuth reading (A1) at the first azimuthal direction, the first gyroscope angular rate reading ($\omega 1$) at the first azimuthal direction; and the second goniometer azimuth reading (A2) at the second azimuthal direction and the second gyroscope angular rate reading ($\omega 2$) at the second azimuthal direction.

In some embodiments, the first gyroscope angular rate reading ($\omega 1$) may comprise multiple readings, which may be averaged to provide a single value. In some embodiments, the second gyroscope angular rate reading ($\omega 2$) may comprise multiple readings, which may be averaged to provide a single value.

In some embodiments, the device may comprise a fiber optic gyroscope (FOG), laser ring gyroscope, MEMS or any combination thereof.

In some embodiments, a spirit level may be used for leveling the goniometer.

In some embodiments, an azimuth finding system may comprise: a goniometer having a rotation axis, wherein the goniometer is adapted to be leveled and further adapted to provide at least a first goniometer azimuth reading (A1) at a first azimuthal direction and a second goniometer azimuth reading (A2) at a second azimuthal direction; and a gyroscope having a sensitivity axis, wherein the gyroscope is adapted to be mounted to the goniometer such that the sensitivity axis of the gyroscope is essentially perpendicular to the rotation axis of the goniometer; and wherein the gyroscope is adapted to provide at least a first gyroscope angular rate reading ($\omega 1$) at the first azimuthal direction and a second gyroscope angular rate reading ($\omega 2$) at the second azimuthal direction.

In some embodiments, the system may further comprise a processing unit adapted to calculate azimuth, based at least on: the first goniometer azimuth reading (A1) at the first azimuthal direction, the first gyroscope angular rate reading ($\omega 1$) at the first azimuthal direction; and the second goniometer azimuth reading (A2) at the second azimuthal direction and the second gyroscope angular rate reading ($\omega 2$) at the second azimuthal direction.

In some embodiments, a method for finding north may comprise: leveling a goniometer; performing a first goniometer azimuth reading (A1) at a first azimuthal direction; performing a first gyroscope angular rate reading ($\omega 1$) at the first azimuthal direction; rotating the goniometer to a second azimuthal direction which is different than the first azimuthal position; performing a second goniometer azimuth reading (A2) at the second azimuthal direction; and performing a second gyroscope angular rate reading ($\omega 2$) at the second azimuthal direction. The second azimuthal position may be approximately 90 degrees from the first azimuthal position.

In some embodiments, azimuth may be calculated based at least on the first goniometer azimuth reading (A1) at the first azimuthal direction, the first gyroscope angular rate reading ($\omega 1$) at the first azimuthal direction, the second goniometer azimuth reading (A2) at the second azimuthal direction and the second gyroscope angular rate reading ($\omega 2$) at the second azimuthal direction.

In some embodiments, at least the following types of sensors may be used: Ring laser gyro; fiber optics; MEMS.

Some embodiments may provide other and/or additional benefits and/or advantages.

BRIEF DESCRIPTION OF DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION OF SOME EMBODIMENTS

In the following description, various aspects of techniques (including devices, systems and/or methods) for north finding will be described. For the purpose of explanation, specific configurations and details are set forth in order to provide a thorough understanding of the techniques. However, it will also be apparent to one skilled in the art that the techniques may be practiced without specific details being presented herein. Furthermore, well-known features may be omitted or simplified in order not to obscure the description(s) of the techniques.

The term "azimuth" as used herein is generally indicating a horizontal (side to side, left or right) direction, such as in what direction a star (or laser-designated target) is located, from a reference point such as straight ahead. An azimuth is the angle from a reference vector in a reference plane to a second vector in the same plane, pointing toward, (but not necessarily meeting), something of interest. For example, with the sea as your reference plane, the azimuth of the Sun might be the angle between due North and the point on the horizon the Sun is currently over. An imaginary line drawn along the surface of the sea might point in the direction of the Sun, but would obviously never meet it. Azimuth is usually measured in degrees (°). The concept is used in many practical applications including navigation, astronomy, mapping, mining and artillery. In artillery laying, an azimuth is defined as the direction of fire. An azimuthal direction may be specified in degrees, with reference to compass points. "0" or "360" degrees corresponds with due north, "90" degrees corresponds with due east, "180" degrees corresponds with due south, and "270" degrees corresponds with due west.

The term "compass" as used herein refers to a compass, magnetic compass or mariner's compass, which is a navigational instrument for determining direction relative to the earth's magnetic poles. It consists of a magnetized pointer (usually marked on the North end) free to align itself with Earth's magnetic field. The face of the compass generally highlights the "cardinal" points of due north, due south, due east and due west.

The term "elevation as used is generally indicating a vertical (up and down) direction, such as how high a star (or laser-designated target) is positioned in the sky from a reference point such as the horizon. The elevation of a geographic location is its height above a fixed reference point, often the mean sea level. Elevation, or geometric height, is mainly used when referring to points on the Earth's surface, while altitude or geopotential height is used for points above the surface, such as an aircraft in flight or a spacecraft in orbit.

The term "FOG" as used herein refers to a fiber optic gyroscope (FOG) which is a gyroscope sensor that does not have spinning parts. This is a gyroscope that uses the interference of light to detect mechanical rotation. The sensor may be a coil of as much as 5 km of optical fiber. Two light beams travel along the fiber in opposite directions. Due to the Sagnac effect, the beam traveling against the rotation experiences a slightly shorter path than the other beam. The resulting phase shift affects how the beams interfere with each other when they are combined. The intensity of the combined beam then depends on the rotation rate of the device.

The term "goniometer" refers to an instrument that either measures angle or allows an object to be rotated to a precise angular position. The term goniometry is derived from two Greek words, gonia, meaning angle, and metron, meaning measure. A positioning goniometer or goniometric stage is a device used to rotate an object precisely about a fixed axis in space. It is similar to a linear stage, however, rather than moving linearly with respect to its base, the stage platform rotates partially about a fixed axis above the mounting surface of the platform. Positioning goniometers typically use a worm drive with a partial worm wheel fixed to the underside of the stage platform meshing with a worm in the base. The worm may be rotated manually or by a motor as in automated positioning systems.

The term "gyro" as used herein is short for gyroscope.

The term "gyrocompass" as used herein refers to a device that may use a combination of spinning mass and pendulous weights to take advantage of three key forces exerted on a spinning gyro: the rotation of the earth, gravity, and gyroscopic precession. Gyrocompasses point at the geographic (north) pole, and indicate true direction. Modern gyrocompasses may be implemented in miniaturized and solid state devices, such as MEMS and FOG.

The term "indirect firing" may be used herein in the context of warfare (e.g., artillery). Direct fire means aiming through a sight directly at the target. Indirect fire means that aiming does not rely on directly viewing the target through the sights. The implication is that azimuth and/or elevation 'aiming' is done using indirect methods. In practice and in the modern sense it usually means both. Hence indirect fire means applying 'firing data' to azimuth and elevation sights and laying these sights.

The term "latitude" as used herein, usually denoted symbolically by the Greek letter phi ($\Phi$), gives the location of a place on Earth (or other planetary body) north or south of the equator. Lines of Latitude are the horizontal lines shown running east-to-west on maps. Technically, latitude is an angular measurement in degrees (marked with °) ranging from 0° at the equator (low latitude) to 90° at the poles (90° N or +90° for the North Pole and 90° S or −90° for the South Pole). The equator divides the planet into a Northern Hemisphere and a Southern Hemisphere, and has a latitude of 0°.

The term "longitude" as used herein, usually denoted symbolically by the Greek character lambda (λ), is the geographic coordinate most commonly used in cartography and global navigation for east-west measurement. A line of longitude is a north-south meridian and half of a great circle.

The term "MEMS" as used herein is short for micro-electromechanical systems.

The term "north" as used herein may be based on the following discussion: The earth spins about an axis. "True" or "geographic" north is the point on the globe exactly 90 degrees north of the equator, and through which the earth's rotational axis meets the surface. The spin axis of the earth is approximately aligned towards Polaris, the "north star". In contrast with true north, magnetic north is the direction where a compass points to. The magnetic north pole is near the geographic north pole, and moves around. Magnetic north can only provide a crude approximation of where true north is. Other techniques, such as observing a shadow, can be more accurate.

The term "Sagnac Effect" refers to an effect which utilizes the physical principle that the speed of light is constant. Two beams of laser light are sent in opposite directions around a ring. Because the speed of the laser light is constant, the motion of the optic ring itself, the laser, and the detector, have no effect on the individual light beams. An interference effect is created when the two counter-rotating laser beams are recombined at the detector. Imagine a FOG sensor that is rotating clockwise as seen from the top. A solid-state laser creates a single laser beam. The laser light is split into two beams, one going clockwise, and one counter-clockwise. After traveling through the fiber optic loops, the laser beams are recombined at the detector. The beam going clockwise will have to travel a little farther in going from the laser to the detector, because the detector has rotated away from it some; the beam going counterclockwise travels a little less from the laser to the detector because the detector has rotated into it. The difference in distance traveled creates a phase shift (ΔS) between the two beams.

The Sagnac phase shift, ΔS, can be calculated, for example, as $$\Delta S = 8\pi n A \omega / c \lambda$$

where
A is the cross-sectional area enclosed by the fiber optic coil,
n is the number of turns of the optical fiber around the ring,
ω is the angular rotation around the sensitive axis,
c is the speed of light, and
λ is the laser light wavelength.

Because n, A, c and λ are all known, the FOG sensor can translate a measured ΔS into the angular rotation rate ω.

For example, a device that harnesses the Sagnac effect is the ring Laser Gyro (RLG). In an RLG, a laser beam is split and sent in opposite directions around an optical path. The light from the laser travels through a mixture of inert helium/neon gas within a pressurized cavity of specially polished glass. High reflectivity mirrors are used to direct the light beam around the glass cavity. When the light beams recombine at the detector, the interference pattern is measured to determine angular rotation.

Another gyro device utilizing the Sagnac Effect is the Fiber Optic Gyro (FOG). A FOG is similar to an RLG in that it uses a laser diode or superlumininescent diode as the light source, along with couplers, polarizers and a light detector. The major difference in the devices, however, lies with the medium in which the light beams travel. A FOG uses a coil of optical fiber for its optical path. FOGs are divided into two types: (1) Closed-loop using an Integrated Optical Chip (IOC) to modulate the light within an optical circuit; and (2) Open-loop using a piezo-electric modulator (PZT) integrated directly into the fiber optic path.

The terms "spirit level" or "bubble level" as used herein refer to an instrument designed to indicate whether a surface is level or plumb. Different types of spirit levels are used by carpenters, stone masons, bricklayers, other building trade workers, surveyors, millwrights and other metalworkers, and serious videographers. One form of the spirit level is the bull's eye level: a circular flat-bottomed device with the liquid under a slightly convex glass face which indicates the center clearly. It serves to level a surface in two perpendicular directions, while a tubular level only does so in the direction of the tube.

North-seeking gyroscopes or gyrocompasses have been developed and are traditionally characterized by reference to a freely rotating gyroscope rotor having damped precession about its own axis of rotation which naturally aligns parallel to the earth's axis of rotation and perpendicular to the local centripetal acceleration vector due to the effective torque induced by the horizontal component of the Coriolis force.

The angular space-stability characteristic of gyroscopes relative to the earth's rotational movement is known. The use of precession of the spin axis of a gyroscope rotor, where the gyroscope housing is fixed relative to a host vehicle and the rotor/gimbal assembly is fixed to motionless angular space in order to generate navigational signals, is also well known.

When the axis of a spinning rotor is torqued around an axis normal to the spin vector, or a component thereof, in a given direction, such as by the torque required to power an electric power generator, then the gyro rotor spin vector precesses. This occurs, for example, when the gyroscope is mounted anywhere on the earth with the outer gimbal axis aligned with the earth's polar axis and a component of the rotor spin axis, or spin vector component, is parallel to the equatorial plane. The gyro rotor and inner gimbal will experience a tilting torque around the axis normal to both the spin vector equatorial plane component and the externally applied polar-axis torque vector resulting in precession of the rotor axis around an axis in the equatorial plane normal to both "input" vectors. In gyro theory, if the axis of the applied torque is normal to the rotor spin vector, or a component thereof, the axis of precession movement (output motion) is normal to both "input" vectors.

There are basically two kinds of compassing systems: 1) having a spinning gyro; and 2) having a non-spinning gyro. A non-spinning gyro generally comprises a sensor of angular velocity.

Some embodiments may be used in conjunction with devices, systems and/or methods described in U.S. Pat. No. 4,945,647 and/or U.S. Pat. No. 5,060,392, both of which are hereby incorporated by reference in their entirety, and which describe systems using non-spinning gyros.

For example, some embodiments may be used in conjunction with device, system and methods described in U.S. Pat. No. 4,945,647, which describes diagrammatic representations illustrating the objective of gyrocompassing, i.e. to determine the angle from true north of the forward direction of the north finding system.

At any point on the earth, the earth's spin vector has a
    component tangential to the earth's surface (known as
    the "horizontal component of earth's rate", ωH) and
    another component (not shown) normal to the surface (the "vertical component of earth's rate ωV). For a spherical earth, ωH and ωV are functions of latitude only, and are given by:

ωH=ωIE cos L, and

ωV=IE sin L where
ωIE is the total magnitude of the earth's rotation rate (15.041 degrees/hour), and
L is latitude.
Conveniently, ωH always locally points North, so the platform calculates heading as the angle between ωH and the horizontal projection of the platform X axis.

Some embodiments may be used in conjunction with devices, systems and method described in U.S. Pat. No. 5,060,392; which may be similar to U.S. Pat. No. 4,945,647, with the following main differences: The arrangement of U.S. Pat. No. 4,945,647 uses a single gyro mounted so the input axis of the gyro can rotate to any direction in the XY plane of the platform. When the platform case is level, the gyro IA is kept in a level plane, and is only subject to components of ωh.

Operation of Angular Rate Sensors

Angular rate sensors are used in conjunction with accelerometers to make a dynamic measurement of orientation angle. Angular rate sensors are also used by themselves to track rotational motion.

Angular rate is a rotational speed. It is the motion of a record turning on a record player, a pure rotation. Angular rate can be specified in various units.

RPM—rotations per minute
deg/s—degrees per second
rad/s—radians per second
1 RPM=360 deg/60 sec=6 deg/s
1 rad/s=(180 deg/t rad)*1 rad/s=57.3 deg/s It is noted that a rate sensor cannot measure an angle or orientation by itself. It only measures rotational motion. The angular rate may be integrated over time to get angle as a function of time. For example:

θ(t)=∫ω(t')dt'

MEMS Rate Sensors

MEMS sensors are designed to measure angular rate using the Coriolis force. According to Coriolis, an object moving in a rotating frame would cause an observer on the rotating frame to see an apparent acceleration of the object. In other words, if an object is moving in a straight line, and it is subject to a rotation, you will see a deviation from the original straight line.

Figure 1:
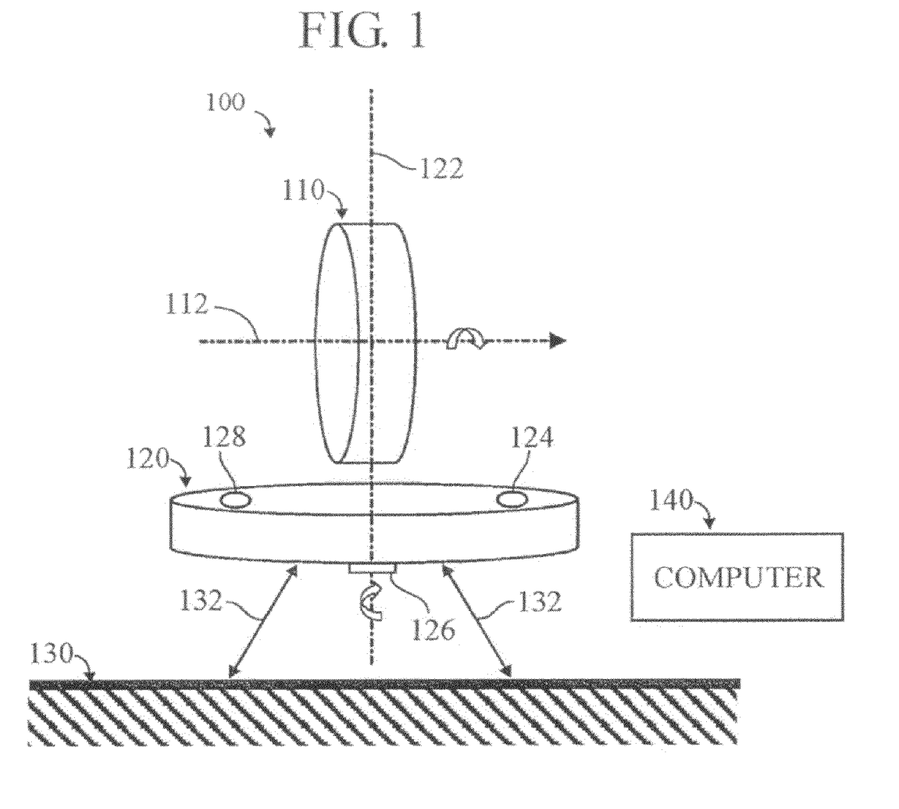
FIG. 1 schematically shows, in perspective view, a north finding (NF) device, in accordance with some demonstrative embodiments.

For example, FIG. 1 shows how an observer on the rotating earth will see apparent accelerations of objects moving perpendicular to the Earth. Noted are:
Coriolis force caused by the earth's rotation
Objects accelerate to the right in the Northern hemisphere.
Objects accelerate to the left in the Southern hemisphere.

Accuracy and Errors in Gyro Technology

Each class of gyro is faced with its own challenges to its accuracy, reliability and durability. Mechanical and MEMS gyros, for example, are affected by inertia, shock and vibration. Fiber optic gyros have a set of inherent errors that FOG manufacturers work hard to mitigate. The transition from analog to digital signal processing has allowed FOG manufacturers to compensate for some of these errors and produce FOGs with greater accuracy and improved reliability.

Bias Stability

Like any type of gyro, even when a FOG is stationary it can register some rotation, even where there is none. This is known as "bias error" and it varies with temperature. Bias error may be a repeatable error which can be corrected using an temperature sensors and an internal table of bias offset values for each FOG. Bias stability generally cannot be predicted, and needs to be constant during measurement.

Scale Factor

Scale factor error relates to the rate of rotation of the FOG and is defined as the difference between the input rate and the measured rate. In other words, for example, if the user rotates the FOG by 90 degrees, does it register a 90-degree turn? As the rate of rotation increases, the error potential may increase. (Scale factor generally cannot be predicted, and needs to be constant and known during measurement.)

Angle Random Walk (ARW)

The output of a FOG may include a random noise element. Angle random walk (ARW), which is defined in terms of degrees/√hour, describes the average deviation or error that may occur as a result of the noise element, even when the FOG is at rest and should have an output equal to zero. Major contributors to random noise may be the active elements in a FOG, such as the detector and/or the light source.

Some embodiments may be used in conjunction with devices, systems and methods for ARW noise reduction, for example, as described in U.S. Pat. No. 6,836,334, which is incorporated herein by reference in its entirety. For example, ARW can be reduced by conducting multiple measurements and averaging.

It is noted that in U.S. Pat. No. 4,945,647, autonomous system is used that has a motor that spins it and a tilt measuring device. In contrast, in some embodiments, there is no use of a motor and a tilt measurement device since the system is placed on an existing goniometer which can be turned (rotated) manually and it is very accurately leveled (so no need for tilt measurement). The measurements of parameters and angles of a motor (as in U.S. Pat. No. 4,945,647) tend to be less accurate. In addition, the motor itself may introduce more errors to the measurement due to its noise, even when using a lock. Due to this reason, the system of U.S. Pat. No. 4,945,647 may require a very expensive sensor (laser ring) to compensate for the inaccuracy in the measurement of the angle.

FIG. 1 schematically illustrates a north-finding device (apparatus) 100 comprising a gyroscope 110 mounted on a goniometer 120, in accordance with some demonstrative embodiments.

In some embodiments, apparatus 100 may allow a user to accurately find geographic north; more specifically, to find the azimuth as angle between the geographic north and the system (as contrasted with magnetic north).

In some embodiments, a fixed platform 130 may be provided to support the gyroscope and goniometer. The fixed platform 130 may comprise three legs (such as a tripod) 132 for leveling the goniometer In some embodiments, the goniometer 120 comprises a support member, which may be a plate or disc, rotatable to various positions about an axis (rotation axis) 122. A level indicating device 124, such as a spirit level, may be mounted to the goniometer 120 so that it may be leveled. In use, the goniometer 120 may be installed (disposed) approximately parallel to the ground.

In some embodiments, a mechanism 126 may be provided for rotating (or indexing) the goniometer 120 to different azimuthal directions, such as in a full circle between "0" and "360" degrees. The indexing mechanism 126 may be manual, such as a thumbscrew and worm gear. Indexing marks or the like (such as a counter) may be provided so that a user may set the position of the goniometer to various azimuthal directions with a desired degree of accuracy. A compass 128 may be provided to initially align the goniometer with magnetic north.

In some embodiments, a user may orient the goniometer 120 in at least two different azimuthal directions. For example, one position (or "setting") of the goniometer 120 may be in an north-easterly direction, or at 45 degrees. Another demonstrative position of the goniometer 120 may be in a south-easterly direction, or at 135 degrees.

In some embodiments, these two exemplary azimuthal directions are separated by each other by 90 degrees (135−45=90). They are perpendicular to each other. The first position (45 degrees, in this example) may be considered to be an x-axis of a reference plane, and the second position (135 degrees, in this example) may be considered to be the y-axis of the reference plane.

In some embodiments, the two azimuthal directions need not be separated by exactly 90 degrees. In some embodiments, it is, however, important that the separation angle is known, with reasonable precision. In some embodiments, separation angles which are nearly 90 degrees may be more useful than angles which are far from 90 degrees (such as nearly 0 degrees, or nearly 180 degrees).

In some embodiments, the gyroscope 110 may comprise a single fiber optic gyroscope (FOG) or a micro-electromechanical system (MEMS) gyroscope or a laser ring or any other sensor that may be in the future, and is fixedly mounted to the goniometer 120. The gyroscope 110 has sensitivity axis 112. The gyroscope's sensitivity axis 112 may be substantially perpendicular to the goniometer's rotation axis 122 (the sensor axis and the goniometer axis do not have to be at 90 degrees, but the angle should be constant), and at various azimuthal angles of the goniometer 120 remains in a plane which is substantially tangential to the surface of the earth.

In some embodiments, at each position two parameters may be measured: angular speed (angular rate); and angle of goniometer (azimuth reading).

Angular rates ($\omega$) for the gyroscope 110 may be provided as signals to a computer 140 which may also receive signals indicative of the goniometer azimuth readings (A). The computer 140 may also control overall operation of the north finding device. "A" is the angle between the moving part of the goniometer and the stationary part of the goniometer; it is not the "real" azimuth.

Figure 2:
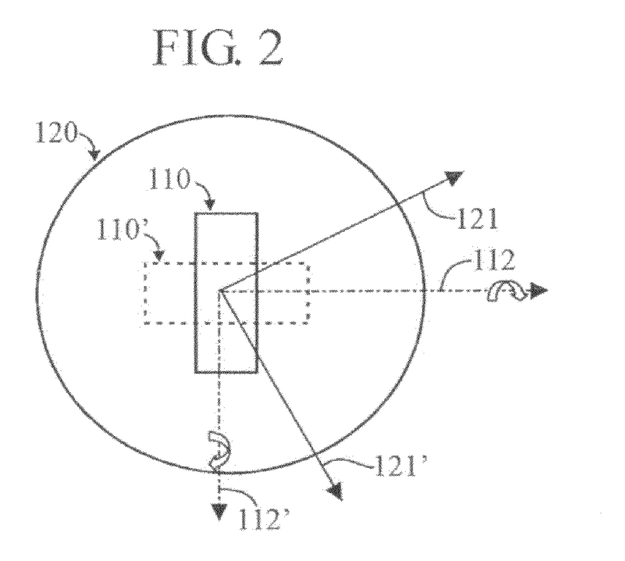
FIG. 2 schematically shows, in top view, a method of using a NF device, in accordance with some demonstrative embodiments.

FIG. 2 schematically illustrates a demonstrative method of using the device 100 of FIG. 1. Some elements from FIG. 1 are omitted in FIG. 2, for illustrative clarity.

Figure 3:
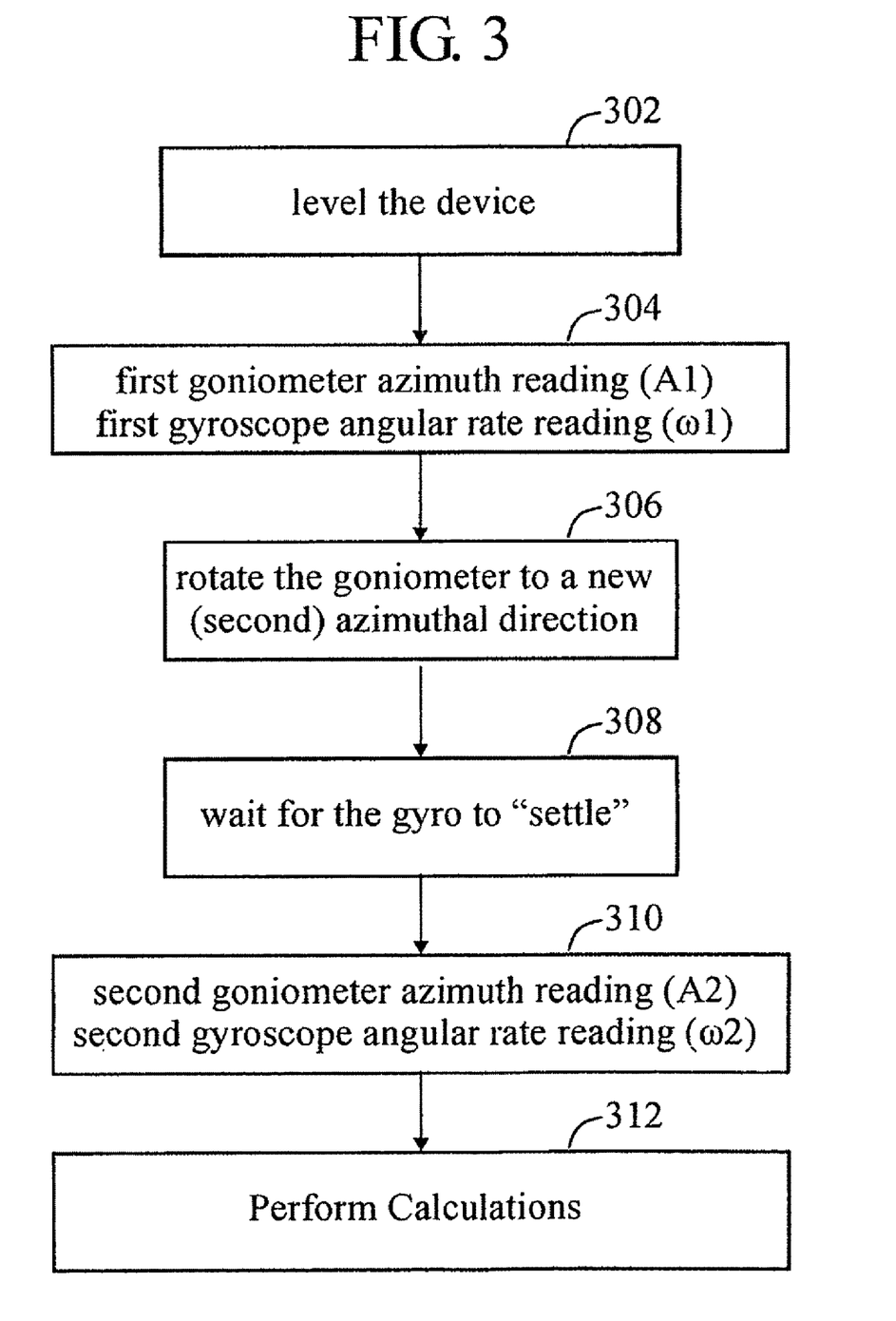
FIG. 3 is a schematic flowchart of a method of using a NF device, in accordance with some demonstrative embodiments.

FIG. 3 schematically illustrates the method in flowchart form.

As described, the goniometer 120 may be mounted on a fixed platform (130), and is leveled. The gyroscope's sensitivity axis is perpendicular to the goniometer's rotation axis.

In some embodiments, measurements of gyroscope angular rate ($\omega$) are taken from at least two different goniometer azimuth positions.

The method may, for example, comprise the following two steps.

Step 1 may comprise:
with the goniometer 120 leveled, and the gyroscope 110 turned on. (FIG. 3, 302), perform the following measurements:
take (perform, make) a first goniometer azimuth reading (A1) at a first azimuthal direction 121 which may be designated as the x-axis (FIG. 3, 304). The gyroscope sensitivity axis is labeled 112.
take (perform, make) a first gyroscope angular rate reading ($\omega$1) at the first azimuthal direction 121 (FIG. 3, 304).

This measurement may be taken a few times and averaged. Averaging of a number of measurements (all taken at the same position of the goniometer) may reduce the problem of the sensor's noise as mentioned above in conjunction with Angle Random Walk.

Step 2 may comprise:
move (rotate) the goniometer to a new azimuthal direction 121', such as approximately 90 degrees from the first azimuthal position 121, which may arbitrarily be designated as the y-axis. (A 90 degree separation is recommended.) The gyroscope 110' (dashed lines) moves with the goniometer and becomes re-oriented, and its sensitivity axis 112' also becomes re-oriented (FIG. 3, 306). Perform the following measurements:
take (perform, make) a second goniometer azimuth reading (A2) at the second azimuthal direction 121' (FIG. 3, 310).
take (perform, make) a second gyroscope angular rate reading ($\omega$3) at the second azimuthal direction 121' (FIG. 3, 310). This measurement may be taken a few times and averaged. Averaging of a number of measurements (all taken at the same position of the goniometer) may reduce the problem of the sensor's noise as mentioned above in conjunction with Angle Random Walk.

In some embodiments, the second goniometer azimuth and gyroscope angular rate readings (measurements) may be taken some seconds or minutes after taking the first goniometer azimuth and gyroscope angular rate readings. In other words, waiting a period of time such as at least 10 seconds, including at least 20 seconds, 30 seconds, 1 minute, 2 minutes, after taking the first goniometer and gyroscope measurements (or after rotating to the second azimuthal position) before taking the second gyroscope measurement (FIG. 3, 308).

In some embodiments, generally, there is no significant reason to wait to take the goniometer measurement, but the gyroscope may need some time to "settle" after the goniometer is moved to the second azimuthal direction.

In some embodiments, the azimuth (A1, A2) and angular rate ($\omega$1, $\omega$2) readings are provided to the computer (140), and calculations are performed (FIG. 3, 312) This enables the extraction of the gyroscope bias and the Earth rotation rate. And since the earth's rotation speed is known, the earth's rotation axis, and hence the north can be determined. Calculations may be performed internal to the device, using a small embedded computer or processor or controller which also receives the goniometer/gyro readings, optionally using other suitable hardware components, software modules, memories, storage units, input units, output units, or the like.

Computer 140 may be implemented, for example, using one or more processors, controllers, memory units, storage units, hardware units, software modules, applications, Operating System (OS), communication units, input units, output units, and/or other suitable components.

Some Applications for the Device

Mounting it to a datum point finding system installed on a tripod and equipped with a GPS, a laser rangefinder and a telescope. For example, as discussed herein with reference to FIG. 6.

In some embodiments, the system may extract a datum point of a remote target it observes (usually up to 20 KM away), by knowing: the system's location (by GPS); the distance to the target (by rangefinder); the north (by using the north finding device discussed herein).

Figure 4:
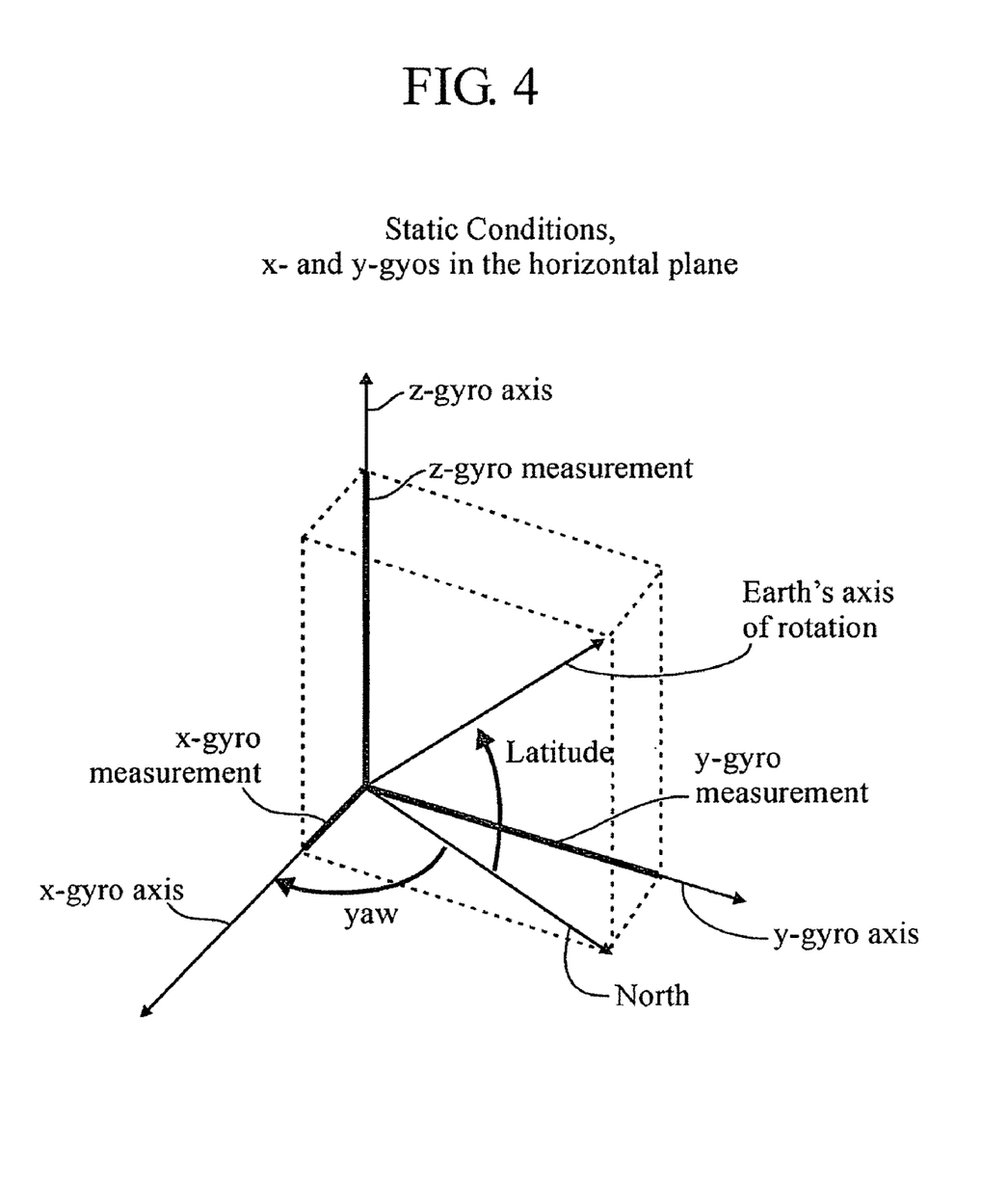
FIG. 4 is a schematic diagram illustrating some parameters which may be used in accordance with some demonstrative embodiments.

FIG. 4 is a schematic diagram illustrating static conditions, x- and y-gyros in the horizontal plane.

In the diagram,
- a thin line passing through the left-front-bottom corner of the box represents the x-axis;
- a shorter line extending to the left-front-bottom corner of the box represents the x-gyro measurement;
- a thin line passing through the right-back-bottom corner of the box represents the y-axis;
- a shorter line extending to the right-back-bottom corner of the box represents the y-gyro measurement;
- a thin line passing through the left-back-top corner of the box represents the z-axis;
- a shorter line extending to the left-back-top corner of the box represents the z-gyro measurement.

In some embodiments, a measurement sequence may be performed, as follows:
1) Integration of the FOG output, when it is placed according to X axis during known time $T_X$
2) Rotation of the FOG to the Y axis
3) Integration of the FOG output, when it is placed according to Y axis, during known time $T_Y$
4) Azimuth calculation.

In some embodiments, (e.g., in an "ideal" case), when the FOG bias is 0, the integrated angles are:

$$A_X = \omega_X \cdot T_X = \Omega \cdot \cos(Lat) \cdot \cos(Az) \cdot T_X$$

$$A_Y = \omega_Y \cdot T_Y = \omega \cdot \cos(Lat) \cdot \sin(Az) \cdot T_Y$$

where:
- A is the angle between the moving part of the goniometer and the stationary part;
- $\omega_X$ and $\Omega_Y$ are the projections of the Earth rotation speed on the axes X and Y;
- $\Omega$ is the Earth rotation speed;
- Lat is latitude.

If both integration intervals are equivalent, azimuth may be calculated as $$Az = \arctan\left(\frac{A_Y}{A_X}\right) \quad (1)$$

In some embodiments, there is unknown bias, and the following equation system may be used:

$$\begin{cases} A_X = \Omega \cdot \cos(Lat) \cdot \cos(Az) \cdot T_X + b_X \cdot T_X \\ A_Y = \Omega \cdot \cos(Lat) \cdot \sin(Az) \cdot T_Y + b_Y \cdot T_Y \end{cases} \quad (2)$$

In some embodiments, if bias of FOG did not change, the result is two equations with two unknowns: bias and azimuth.

In some embodiments, main sources of error may be: Axes misalignment; Bias instability; Integration error because of the FOG output noise (random walk)

In some embodiments, the first two errors may be absent, and thus we may define requirements to $A_X$ and $A_Y$ measurements errors.

$$\frac{\Delta Az}{Az} = (\delta A_X - \delta A_Y) \cdot \frac{A_X}{A_Y \cdot [1 + (A_X/A_Y)^2]} \quad (3)$$

where
- $\delta_X$ — relative error of $A_X$
- $\delta_Y$ — relative error of $A_Y$ In some embodiments, the maximum value of the second multiplier in equation (3) is reached when $A_X = A_Y$ or when azimuth is 45°. In this case:

$$\Delta Az = \frac{\pi}{4} \cdot \sqrt{2} \cdot \delta A \cdot \frac{1}{2}$$

So the relative error of integrated angle should be less than $$\delta A = \Delta Az \cdot \frac{8}{\sqrt{2} \cdot \pi}$$

Let $\Delta Az$=1 mrad=0.001, and we get $\delta A$=1.8·10$^{-3}$

The relative error of integrated error may be calculated as random walk (RW), divided by integrated projection of Earth rotation rate on the horizontal plane.

According to this, we get:

$$\delta A = \frac{RW \cdot \sqrt{T}}{\cos(Lat) \cdot \Omega \cdot T} = \frac{RW}{\cos(Lat) \cdot \Omega \cdot \sqrt{T}}, \quad (4)$$

where RW is the FOG random walk
According to this:

$$RW = \cos(Lat) \cdot \Omega \cdot \sqrt{T} \cdot \delta A \quad (5)$$

The following table shows calculation examples in accordance with some embodiments; other suitable values or calculations may be used.

| ΔAz | Latitude | T | RW, deg/sqrt(Hr)) | RW, deg/Hr/sqrt(Hz) |
|---|---|---|---|---|
| 1 mil | 30 deg | 60 s | 0.00296 | 0.177 |
| 1 mil | 30 deg | 180 s | 0.00513 | 0.308 |
| 1 mil | 60 deg | 180 s | 0.00296 | 0.177 |
| 2 mil | 30 deg | 60 s | 0.00593 | 0.355 |
| 2 mil | 30 deg | 180 s | 0.0103 | 0.616 |
| 2 mil | 60 deg | 180 s | 0.00593 | 0.355 |

Figure 5:
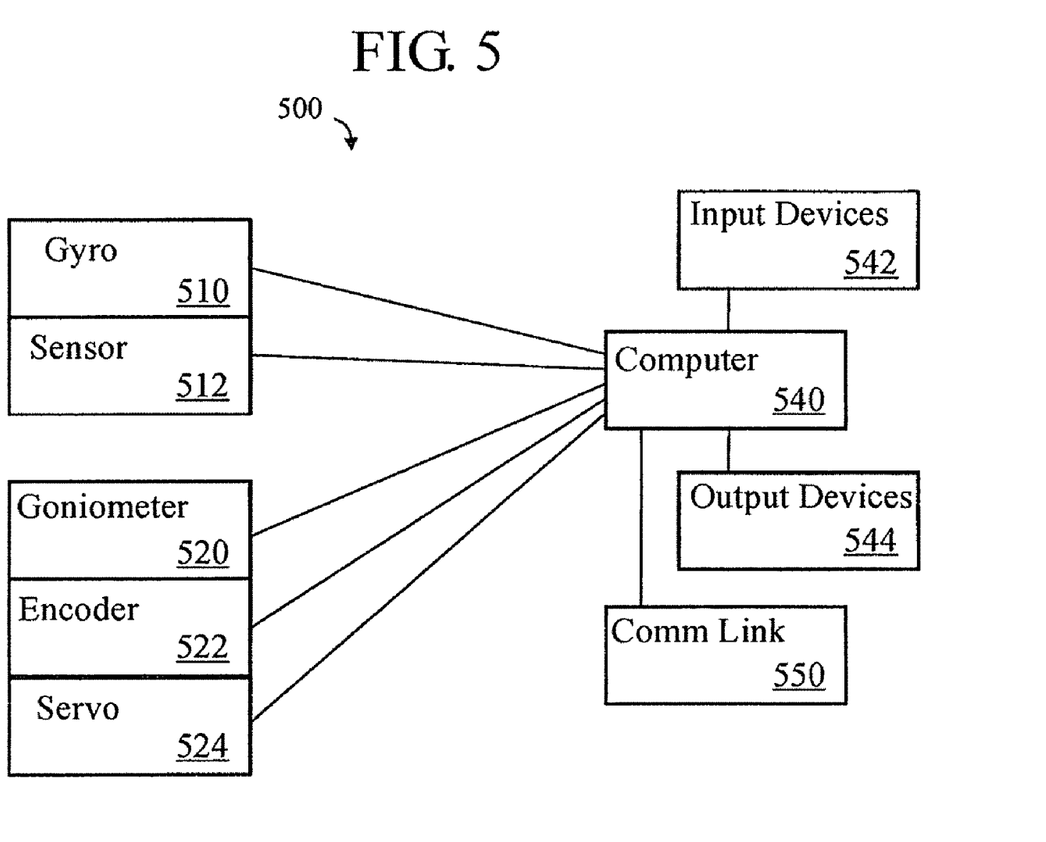
FIG. 5 is a schematic block diagram of a north finding system in accordance with some demonstrative embodiments.

FIG. 5 is a schematic block diagram of a north finding system, in accordance with some demonstrative embodiments.

A north finding (NF) system 500 may comprise:
- a gyro 510 (compare 110), such as a fiber optic gyro (FOG), which may have a built-in angular rate sensor 512; and
- a goniometer 520 (compare 120), which may have an azimuth direction sensor 122 such as a position encoder.

A computer 540 (e.g., compare to computer 140) may receive signals from the angular rate sensor 512 and the azimuth direction sensor 522, and may be appropriately programmed to provide an indication of true north based on the readings (measurements) from those sensors, as described hereinabove. The computer 540 may control operation of the gyro 510, and may also control operation (rotation, positioning) of the goniometer 520 using suitable a servo mechanism 524.

Appropriate input devices 542 such as touchpad, keyboard, mouse, and the like, for controlling operation of the computer 540, may be provided.

Appropriate output devices 544 such as monitor (screen), lights (LEDs) and the like for providing information to the user may be provided.

A communications link 550 may be provided.

Figure 6:
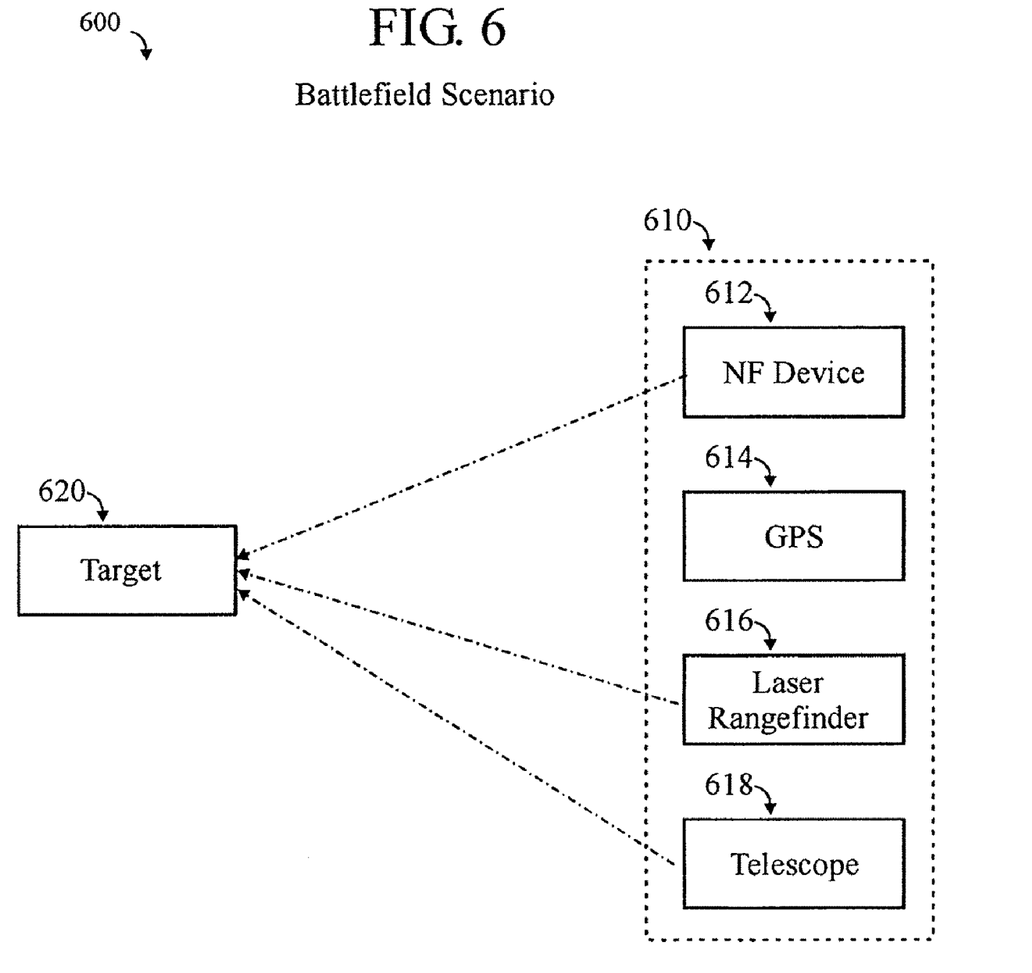
FIG. 6 is a schematic diagram of a battlefield scenario incorporating a north finding system, in accordance with some demonstrative embodiments.

FIG. 6 is a schematic diagram of a battlefield scenario 600 incorporating the north finding device/system in accordance with some demonstrative embodiments.

An overall tactical system 610 for an observer of a target 620 may incorporate, for example:
- the north finding (NF) device 612 for establishing direction to the target 620;
- a global positioning system (GPS) 614 for estasblishing location of the observer;
- a laser rangefinder 616 for determining distance to the target 620; and
- a telescope 618 for visually observing the target 620.

Applications for the System

In some embodiments, the system may be used in many different applications where determining a direction of movement is important, such as navigation of various manned and unmanned vehicles, surveying, targeting, mining, and the like. The cost of the system may be quite low relative to even compasses, given that no scale factor calibration is required. In other embodiments, optionally, one or more measurement steps may be performed in order to estimate or calculate the scale factor In some embodiments, gyroscope bias calibration costs can also be substantially reduced given that accuracy is only driven by the change in bias over the time north seeking information is collected and not by the absolute bias accuracy.

Although some devices, systems and methods are described herein in the context of a FOG, some embodiments are not limited to use with a FOG. For example, the some embodiments may be implemented using a ring laser gyroscope, or a MEMS device.

Instructions for carrying out the various process tasks, calculations, and generation of signals and other data used in the operation of the device, system and method of some embodiments may be implemented in software, firmware, or other computer readable instructions. These instructions are typically stored on any appropriate computer readable media used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as ROM, EPROM, EEPROM, or flash memory devices; magnetic disks such as internal hard disks or removable disks; magneto-optical disks; CDs, DVDs, or other optical storage disks; non-volatile RAM, and other like media; or any other media that can be used to carry or store desired program code means in the form of computer executable instructions or data structures. Any of the foregoing may be supplemented by, or incorporated in, specially-designed application-specific integrated circuits (ASICs), or field programmable gate arrays (FPGAs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

In the description and claims of the application, each of the words "comprise" "include" and "have", and forms thereof, are not necessarily limited to members in a list with which the words may be associated.

Some embodiments has been described using various detailed descriptions of embodiments thereof that are provided by way of example and are not intended to limit. The described embodiments may comprise different features, not all of which are required in all embodiments. Some embodiments utilize only some of the features or possible combinations of the features. Variations of embodiments that are described and embodiments comprising different combinations of features noted in the described embodiments will occur to persons with skill in the art. It is intended that the claims be interpreted to include all such variations and combinations.

What is claimed is:

1. A device comprising:
    a gyroscope adapted to be mounted to a goniometer,
    wherein a sensitivity axis of the gyroscope is substantially perpendicular to a rotation axis of the goniometer,
    wherein the goniometer is adapted to provide at least a first goniometer azimuth reading (A1) at a first azimuthal direction and a second goniometer azimuth reading (A2) at a second azimuthal direction,
    wherein the gyroscope is adapted to provide at least a first gyroscope angular rate reading ($\omega 1$) at the first azimuthal direction and a second gyroscope angular rate reading ($\omega 2$) at the second azimuthal direction,
    wherein the device enables measurement of a tilt angle.

2. The device of claim 1, wherein the goniometer is adapted to be leveled.

3. The device of claim 1, wherein the goniometer comprises a stationary part and a movable part,
    wherein the movable part is adapted to rotate along the rotation axis between at least the first azimuthal direction and the second azimuthal direction,
    wherein the first goniometer azimuth reading (A1) is the angle between the movable part and the stationary part at the first azimuthal direction,
    wherein the second goniometer azimuth reading (A2) is the angle between the movable part and the stationary part at the second azimuthal direction.

4. The device of claim 3, wherein the movable part is manually movable.

5. The device of claim 1, wherein the device is adapted to calculate azimuth, based at least on:
    the first goniometer azimuth reading (A1) at the first azimuthal direction, and the first gyroscope angular rate reading ($\omega 1$) at the first azimuthal direction; and
    the second goniometer azimuth reading (A2) at the second azimuthal direction, and the second gyroscope angular rate reading ($\omega 2$) at the second azimuthal direction.

6. The device of claim 1, wherein the device is functionally associated with a computer adapted to calculate azimuth, based at least on:
    the first goniometer azimuth reading (A1) at the first azimuthal direction, and the first gyroscope angular rate reading ($\omega 1$) at the first azimuthal direction; and
    the second goniometer azimuth reading (A2) at the second azimuthal direction, and the second gyroscope angular rate reading ($\omega 2$) at the second azimuthal direction.

7. The device of claim 1, wherein the first gyroscope angular rate reading ($\omega 1$) comprises multiple readings which are averaged to provide a single value.

8. The device of claim 1, wherein the second gyroscope angular rate reading ($\omega 2$) comprises multiple readings which are averaged to provide a single value.

9. The device of claim 1, wherein the gyroscope comprises: a fiber optic gyroscope (FOG), a laser ring gyroscope, a MEMS, or any combination thereof.

10. The device of claim 1, further comprising:
a spirit level for leveling the goniometer.

11. The device of claim 1, wherein the device is a north finding device.

12. A system comprising:
a goniometer having a rotation axis,
wherein the goniometer is adapted to provide at least a first goniometer azimuth reading (A1) at a first azimuthal direction and a second goniometer azimuth reading (A2) at a second azimuthal direction; and
a gyroscope having a sensitivity axis,
wherein the gyroscope is adapted to be mounted to the goniometer such that a sensitivity axis of the gyroscope is substantially perpendicular to the rotation axis of the goniometer,
wherein the gyroscope is adapted to provide at least a first gyroscope angular rate reading ($\omega 1$) at the first azimuthal direction and a second gyroscope angular rate reading ($\omega 2$) at the second azimuthal direction.

13. The system of claim 12, further comprising a processing unit adapted to calculate azimuth, based at least on:
the first goniometer azimuth reading (A1) at the first azimuthal direction, and the first gyroscope angular rate reading ($\omega 1$) at the first azimuthal direction; and
the second goniometer azimuth reading (A2) at the second azimuthal direction, and the second gyroscope angular rate reading ($\omega 2$) at the second azimuthal direction.

14. The system of claim 12, wherein the first gyroscope angular rate reading ($\omega 1$) comprises multiple readings which are averaged to provide a single value.

15. The system of claim 12, wherein the second gyroscope angular rate reading ($\omega 2$) comprises multiple readings which are averaged to provide a single value.

16. The system of claim 12, wherein the gyroscope comprises: a fiber optic gyroscope (FOG), a laser ring gyroscope, a MEMS, or any combination thereof.

17. The system of claim 12, wherein the goniometer is adapted to be leveled.

18. The system of claim 12, wherein the system is an azimuth finding system.

19. A method comprising:
performing a first goniometer azimuth reading (A1) at a first azimuthal direction;
performing a first gyroscope angular rate reading ($\omega 1$) at the first azimuthal direction;
rotating the goniometer to a second azimuthal direction which is different than the first azimuthal position;
performing a second goniometer azimuth reading (A2) at the second azimuthal direction; and
performing a second gyroscope angular rate reading ($\omega 2$) at the second azimuthal direction.

20. The method of 19, wherein the second azimuthal position is approximately 90 degrees from the first azimuthal position.

21. The method of claim 19, wherein the first gyroscope angular rate reading ($\omega 1$) comprises multiple readings which are averaged to provide a single value.

22. The method of claim 19, wherein the second gyroscope angular rate reading ($\omega 2$) comprises multiple readings which are averaged to provide a single value.

23. The method of claim 19, further comprising:
calculating azimuth, based at least on
the first goniometer azimuth reading (A1) at the first azimuthal direction,
the first gyroscope angular rate reading ($\omega 1$) at the first azimuthal direction,
the second goniometer azimuth reading (A2) at the second azimuthal direction, and
the second gyroscope angular rate reading ($\omega 2$) at the second azimuthal direction.

24. The method of claim 23, further comprising:
determining north.

25. The method of claim 19, further comprising:
leveling a goniometer used for performing the goniometer azimuth readings.

* * * * *